United States Patent
Weingarten

(10) Patent No.: US 7,458,393 B2
(45) Date of Patent: Dec. 2, 2008

(54) CONTROL VALVE WITH INTEGRATED INSERT PROVIDING VALVE SEAT AND PLUG GUIDES

(75) Inventor: Zvi Weingarten, Kibbuts Evron (IL)

(73) Assignee: Bermad CS, Ltd, Kibbuts Evron (IL)

( * ) Notice: Subject to any disclaimer, the term of this patent is extended or adjusted under 35 U.S.C. 154(b) by 23 days.

(21) Appl. No.: 11/390,243

(22) Filed: Mar. 28, 2006

(65) Prior Publication Data

US 2007/0227600 A1     Oct. 4, 2007

(51) Int. Cl.
    *F16K 1/32*     (2006.01)
(52) U.S. Cl. .................. 137/625.34; 251/14; 251/82
(58) Field of Classification Search ............. 137/625.3, 137/625.33, 625.34, 625.37, 325.38, 625.39; 251/14, 82
    See application file for complete search history.

(56) References Cited

U.S. PATENT DOCUMENTS

| | | | | |
|---|---|---|---|---|
| 1,807,446 A * | 5/1931 | Smeby | .................. | 137/625.37 |
| 1,813,222 A * | 7/1931 | Barrett | .................. | 137/328 |
| 3,157,200 A * | 11/1964 | Rowan | .................. | 137/625.33 |
| 3,631,891 A * | 1/1972 | Brumm | .................. | 137/625.3 |
| 3,648,718 A * | 3/1972 | Curran | .................. | 137/269 |
| 3,971,411 A * | 7/1976 | Baumann | .................. | 137/625.3 |
| 3,990,475 A * | 11/1976 | Myers | .................. | 137/625.3 |
| 4,149,563 A * | 4/1979 | Seger | .................. | 137/625.3 |
| 4,356,996 A * | 11/1982 | Linder et al. | .................. | 251/82 |
| 4,573,489 A * | 3/1986 | Carlton et al. | .................. | 137/59 |
| 4,669,702 A * | 6/1987 | Tripp | .................. | 251/210 |
| 4,834,133 A * | 5/1989 | LaCoste et al. | .................. | 137/315.11 |
| 5,706,856 A * | 1/1998 | Lancaster | .................. | 137/556.3 |
| 6,382,253 B1 * | 5/2002 | McCarty et al. | .................. | 137/625.33 |
| 6,701,958 B2 * | 3/2004 | Baumann | .................. | 137/625.33 |
| 6,807,985 B2 * | 10/2004 | Stares et al. | .................. | 137/625.33 |
| 6,886,598 B2 * | 5/2005 | McCulloch | .................. | 137/625.39 |
| 6,997,211 B2 * | 2/2006 | Alman et al. | .................. | 137/625.33 |

* cited by examiner

*Primary Examiner*—John Fox
(74) *Attorney, Agent, or Firm*—Mark M. Friedman

(57) ABSTRACT

A control valve for regulating flow of fluids has an actuator located in a control chamber connected to a valve body. The valve body defines a flow passageway passing through an opening. A plug is associated with the actuator such that movement of the actuator from a retracted position towards an extended position displaces the plug towards the opening. The valve also includes a guide-and-seat insert which provides a valve seat interconnected with an attachment collar via a number of plug guides. When the plug is displaced by the actuator, the plug slides in contact with at least two of the plug guides. When the actuator moves to its extended position, the plug closes against the closure surface of the valve seat so as to block the passage of fluid from an inlet to an outlet of the valve.

4 Claims, 4 Drawing Sheets

CONTROL VALVE WITH INTEGRATED INSERT PROVIDING VALVE SEAT AND PLUG GUIDES

FIELD AND BACKGROUND OF THE INVENTION

The present invention relates to control valves for controlling flow of fluids and, in particular, it concerns a control valve in which a valve seat and a plurality of plug guides are integrated as parts of a guide-and-seat insert.

Fluid flow control valves are often implemented with a valve seat which is manufactured separately from the main valve body and subsequently attached to the body. This allows the valve seat to be manufactured from material which has a higher resistance to abrasion than the main body of the valve, and also allows for replacement of the valve seat in case it becomes worn during use.

In certain valves, access to the valve seat itself may be awkward. In such cases, attachment or replacement of the valve seat may be problematic.

Particularly, although not exclusively, in large valves used with high-volume liquid flow, the forces exerted on the valve plug by drag of liquid flowing through the valve cause rapid wear on arrangements of linear bearings used to support the plug along its range of motion. In most cases, the plug is supported by one or two linear bearings deployed coaxially along an axis of symmetry of the plug. Such support structures are mechanically far from ideal.

There is therefore a need for a control valve structure which would allow installation or replacement of a valve seat without requiring direct manual access to the valve seat itself and which would provide enhanced mechanical support for the valve plug, without complicating the structure or maintenance of the control valve.

SUMMARY OF THE INVENTION

The present invention is a control valve in which a valve seat and a plurality of plug guides are integrated as parts of a guide-and-seat insert.

According to the teachings of the present invention there is provided, a control valve for regulating flow of fluids comprising: (a) a body having an inlet, an outlet and a passageway through which the fluid passes from the inlet to the outlet, the passageway passing through an opening; (b) an actuator located in a control chamber connected to the body and configured to move along an axis through a range of motion from a retracted position to an extended position; (c) a plug associated with the actuator such that movement of the actuator from the retracted position towards the extended position displaces the plug towards the opening; and (d) a guide-and-seat insert including: (i) a valve seat configured to seal against the opening and to provide a closure surface against which the plug closes, (ii) a plurality of plug guides integrally formed with the valve seat and extending from the seat towards the control chamber, and (iii) a collar attached to or integrally formed with the plurality of plug guides and configured for clamping against an internal surface of the control valve so as to clamp the valve seat against the opening, such that, when the plug is displaced by the actuator, the plug moves in sliding engagement with at least two of the plug guides, and such that, when the actuator moves to the extended position, the plug closes against the closure surface of the valve seat so as to block the passage of fluid from the inlet to the outlet.

According to a further feature of the present invention, the collar is integrally formed with the plurality of plug guides.

According to a further feature of the present invention, the body and the control chamber intersect at a neck portion, and wherein the collar clamps against an internal surface of the neck portion.

According to a further feature of the present invention, the neck portion features a circumferential groove, and wherein the collar is provided with a circumferential locking element circumscribing a majority of the collar and a tightening arrangement, the tightening arrangement being configured for displacing the circumferential locking element outwards into the groove so as to clamp the collar against the internal surface of the neck portion.

According to a further feature of the present invention, the tightening arrangement includes a plurality of bolts deployed within substantially radial threaded bores spaced around the collar.

According to a further feature of the present invention, the circumferential groove includes an inclined clamping surface deployed such that outward displacement of the locking element against the inclined damping surface displaces the guide-and-seat insert towards the opening so as to clamp the seat against the opening.

According to a further feature of the present invention, the plug includes a replaceable peripheral strip for contacting the plug guides.

According to a further feature of the present invention, the plug includes a replaceable peripheral strip for contacting the plug guides, and wherein the replaceable peripheral strip is formed from a material having a lower wear-resistance than the second material.

According to a further feature of the present invention, the plug has a central axis parallel to a direction of movement of the actuator, and wherein a direction from a center of the opening towards a center of the outlet defines a primary flow vector, all of the plurality of plug guides being angularly spaced from the primary flow vector by at least 20 degrees.

According to a further feature of the present invention, two of the plurality of plug guides are located symmetrically at a given angular spacing on each side of the primary flow vector.

According to a further feature of the present invention, the given angular spacing is between about 40 and about 50 degrees.

According to a further feature of the present invention, the plurality of plug guides are deployed such that, both under forward flow conditions from the inlet to the outlet and under reverse flow conditions from the outlet to the inlet, drag forces acting on the plug are opposed by three-point support of the plug wherein two of the three points are provided by two of the plug guides.

According to a further feature of the present invention, the actuator includes a flexible diaphragm deployed so as to subdivide an internal volume of the control chamber.

According to a further feature of the present invention, there is also provided a supplementary actuator located outside the control chamber and mechanically linked to the plug.

According to a further feature of the present invention, there is also provided a linear bearing deployed between the plug and the actuator such that, when the actuator moves towards the withdrawn position, the plug is free to move between an open position in which fluid flows from the inlet to the outlet and a closed position in which the plug closes against the closure surface of the valve seat so as to block the passage of fluid from the outlet to the inlet, thereby operating as a check valve.

BRIEF DESCRIPTION OF THE DRAWINGS

The invention is herein described, by way of example only, with reference to the accompanying drawings, wherein.

DESCRIPTION OF THE PREFERRED EMBODIMENTS

The present invention is a control valve in which a valve seat and a plurality of plug guides are integrated as parts of a guide-and-seat insert.

The principles and operation of control valves according to the present invention may be better understood with reference to the drawings and the accompanying description.

Figure 1A:
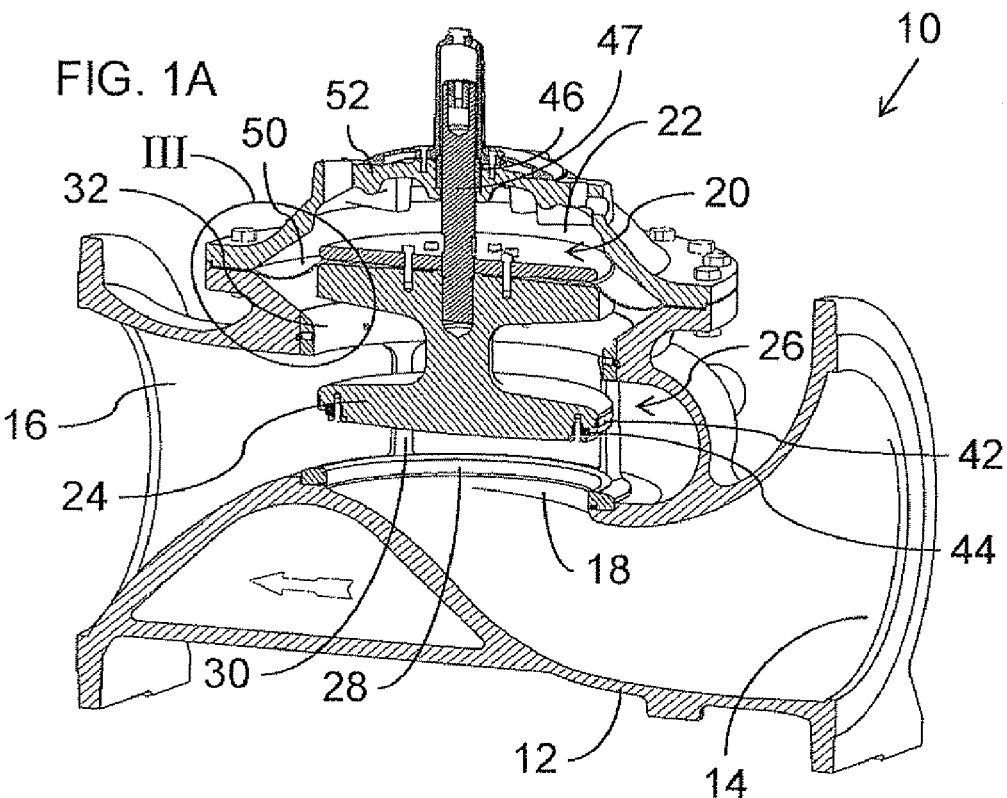
FIGS. 1A and 1B are cut-away isometric views showing a control valve, constructed and operative according to the teachings of the present invention, including a guide-and-seat insert, the control valve being shown in an open state and a closed state, respectively.
Figure 1B:
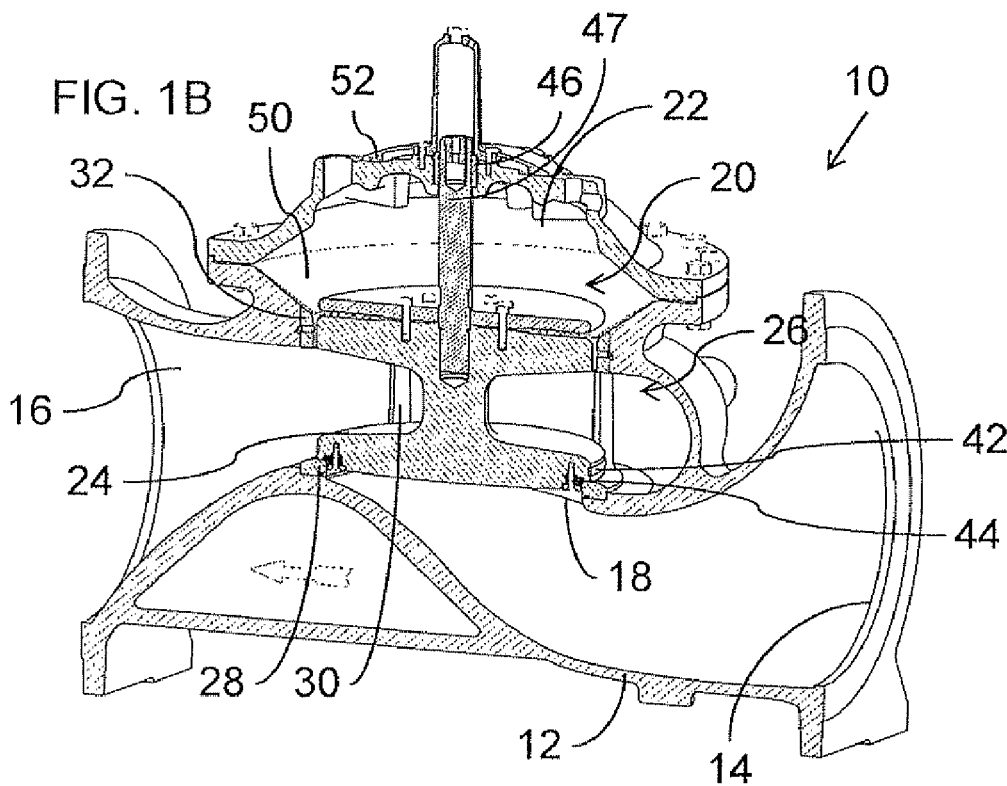
Figure 2:
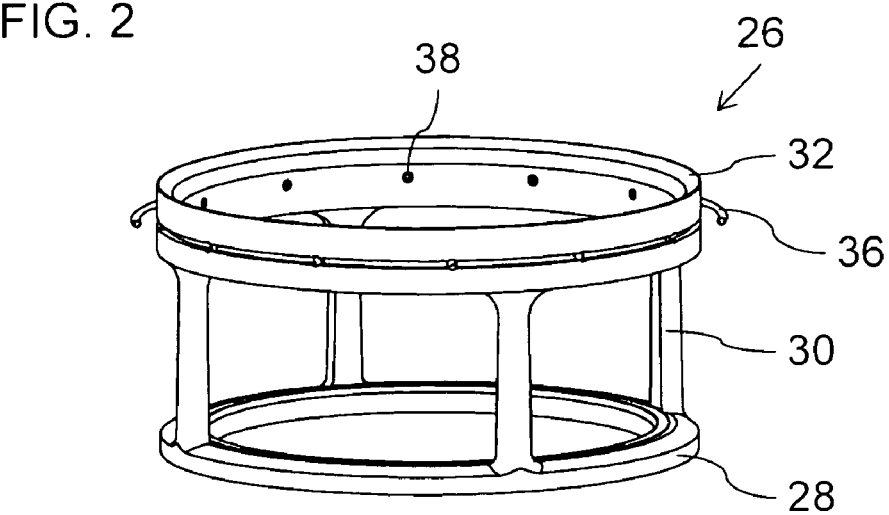
FIG. 2 is an isometric view of the guide-and-seat insert from the control valve of FIGS. 1A and 1B.

Referring now to the drawings, FIGS. 1A and 1B show a control valve, generally designated 10, for regulating flow of fluids. Generally speaking, control valve 10 has a body 12 with an inlet 14, an outlet 16 and a passageway through which the fluid passes from the inlet to the outlet passing through an opening 18. An actuator 20 is located in a control chamber 22 connected to body 12 and configured to move along an axis through a range of motion from a retracted position (FIG. 1A) to an extended position (FIG. 1B). Control valve 10 also includes a plug 24 associated with actuator 20 such that movement of actuator 20 from its retracted position towards its extended position displaces plug 24 towards opening 18. It is a particular feature of the present invention that control valve 10 also features a guide-and-seat insert 26. As better seen in FIG. 2, guide-and-seat insert 26 includes a valve seat 28 configured to seal against opening 18 and to provide a closure surface against which plug 24 closes, a plurality of plug guides 30, integrally formed with valve seat 28, extending from seat 28 towards control chamber 22, and a collar 32, attached to or integrally formed with plug guides 30, configured for clamping against an internal surface of control valve 10 so as to clamp valve seat 28 against opening 18. The control valve is configured such that, when plug 24 is displaced by actuator 20, plug 24 moves in sliding engagement with at least two of plug guides 30, and such that, when actuator 20 moves to its extended position, plug 24 closes against the closure surface of valve seat 28 so as to block the passage of fluid from inlet 14 to outlet 16.

At this stage, it will be clear that the control valve of the present invention provides a particularly simple and elegant solution both for facilitating attachment or replacement of the valve seat and for providing effective support for the plug. Specifically, since attachment of guide-and-seat insert 26 is performed by clamping of collar 32, the location of a tightening arrangement for clamping the insert in place is much more accessible than in most replaceable valve seats. At the same time, the plug guides provide well placed support for plug 24 against lateral drag forces, preferably ensuring stable three-point Support of the plug. These and other advantages of the present invention will become clearer from the following detailed description.

Turning now to the features of the present invention in more detail, collar 32 is preferably integrally formed with plug guides 30 so that the entirety of guide-and-seat insert 26 is essentially formed as a single unit. Collar 32 most preferably clamps to a relatively narrow neck portion of control valve 10 formed at the intersection of body 12 and control chamber 22. The inner diameter of collar 32 is sufficient to allow insertion of plug 24, thereby facilitating simple assembly and disassembly of the control valve.

Figure 3:
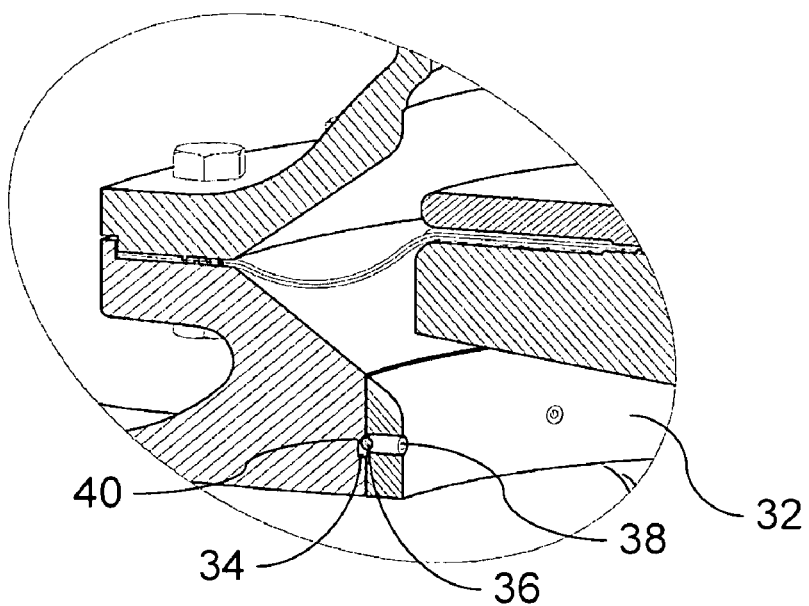
FIG. 3 is an enlarged view of a region of FIG. 1A designated III, illustrating a preferred form of attachment of the guide-and-seat insert to a body of the control valve.

A preferred form of attachment of collar 32 to the neck portion is best seen in FIG. 3. Specifically, the neck portion preferably features a circumferential groove 34. Collar 32 is preferably provided with a circumferential locking element 36 (also shown partially in FIG. 2), circumscribing a majority of the collar, and a tightening arrangement configured for displacing circumferential locking element 36 outwards into groove 34 so as to clamp collar 32 against the internal surface of the neck portion. In the particularly preferred implementation shown here, the tightening arrangement includes a plurality of bolts 38 deployed within substantially radial threaded bores spaced around collar 32. Circumferential groove 34 preferably includes an inclined clamping surface 40 deployed such that outward displacement of locking element 36 against inclined clamping surface 40 displaces guide-and-seat insert 26 towards opening 18 so as to clamp seat 28 against the opening.

Guide-and-seat insert 26 is preferably formed from a material having a higher wear-resistance than the material of body 12. For large-scale implementations, body 12 is typically formed from enameled or epoxy-coated cast iron while guide-and-seat insert 26 is advantageously formed from wear-resistant stainless steal. For smaller scale plastic valves, insert 26 may be implemented from injection-molded plastics with abrasion-resistant additives.

Referring back to FIGS. 1A and 1B, plug 24 is preferably provided with a replaceable peripheral strip 42 which serves as a bearing surface in sliding contact with plug guides 30. Peripheral strip 42 is preferably formed from a material having a lower wear-resistance than that of guide-and-seat insert 26, thereby localizing frictional wear in a simple-to-replace and low-cost component. Plug 24 also preferably features an elastomeric seal 44 deployed in facing relation to the sealing surface of valve seat 28 to seal against the valve seat.

It is a particularly preferred feature of certain implementations of the present invention that plug 24 is supported so that drag forces acting on the plug from fluid flow through the valve are opposed by three-point support of the plug. One of these support points is provided by an upper linear bearing 46 which slidingly supports a valve stem 47 linked to plug 24. The remaining two of the three support points are preferably provided by two of plug guides 30. To this end, plug guides 30 are preferably angularly spaced symmetrically on either side of a primary flow vector. In cases of a bi-directional flow valve, i.e., where the valve is used both under forward flow conditions from the inlet to the outlet and under reverse flow conditions from the outlet to the inlet, the three-point support conditions are preferably maintained for both flow directions.

Figure 4:
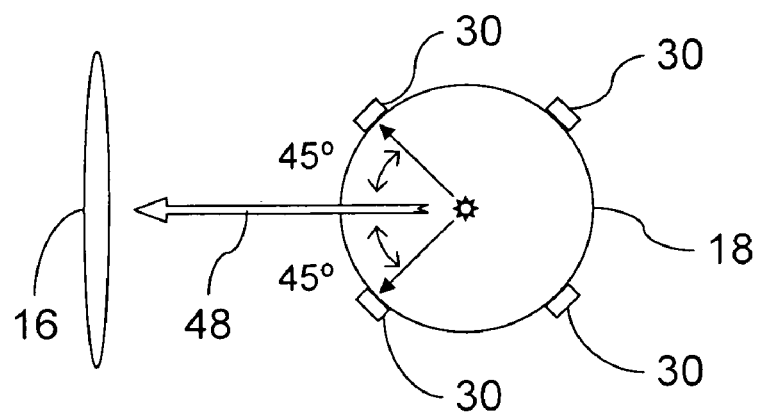
FIG. 4 is a schematic plan view illustrating a geometrical relationship between a primary flow vector through the control valve and deployment of plug guides of the guide-and-seat insert in the control valve of FIGS. 1A and 1B.

In more technical terms, the relevant geometrical relations may be defined in the context of the present embodiment relative to a "primary flow vector" 48 (FIG. 4) defined as a direction from a center of opening 18 towards a center of outlet 16. Plug guides 30 are preferably all angularly spaced from the primary flow vector about the center of opening 18 by at least 20 degrees. In order to provide symmetrical support, the two of plug guides 30 closest to the primary flow vector are preferably located symmetrically at a given angular spacing on each side of the flow vector, preferably in the range of between about 40 and about 50 degrees, and typically at 45 degrees on each side of the primary flow vector. For a bi-directional flow valve, similar conditions preferably apply to the reverse flow direction, for example defined by a vector from the center of opening 18 to a center of inlet 14.

Parenthetically, it will be noted that the terms "support point" or "contact point" as used herein in relation to the support of plug 24 relate to localized physical contact regions, independent of the exact size and shape of the region where contact occurs. In the present example, the support points between plug 24 and plug guides 30 are theoretically rectangles of overlap between the inward-facing surfaces of plug guides 30 and peripheral strip 42. In practice, as with any real mechanical system, forces are typically concentrated on a much smaller area.

Turning now to other features of control valve 10, it should be noted that actuator 20 may be any type of actuator. Particularly preferred examples are hydraulic actuators, including but not limited to diaphragm actuators and piston actuators. In the particularly preferred implementation illustrated here, actuator 20 is a diaphragm actuator including a flexible diaphragm 50 deployed so as to subdivide an internal volume of control chamber 22. Parenthetically, it should be noted that the retracted and extended positions of actuator 20 are defined by the range of motion of actuator 20 in use as part of the structure of control valve 10, and do not necessarily correspond to the full range of motion which could be achieved by the structure of actuator 20 alone.

Amongst other advantages of the preferred implementation illustrated, it will be noted that control valve 10 as shown is particularly simple to assemble and disassemble, such as for maintenance. Specifically, control chamber 22 is formed with a removable cover 52 which is secured by a number of bolts which also secure flexible diaphragm 50 and hence plug 24. Thus, after removing the bolts of cover 52 and lifting off cover 52, the plug/diaphragm combination may be lifted out of the valve. Loosening of bolts 38 then frees guide-and-seat insert 26 which can be lifted out, leaving only body 12. The entire control valve thus disassembles rapidly into four primary components, allowing easy access and rapid maintenance. The assembly procedure is performed similarly in reverse.

Figure 5A:
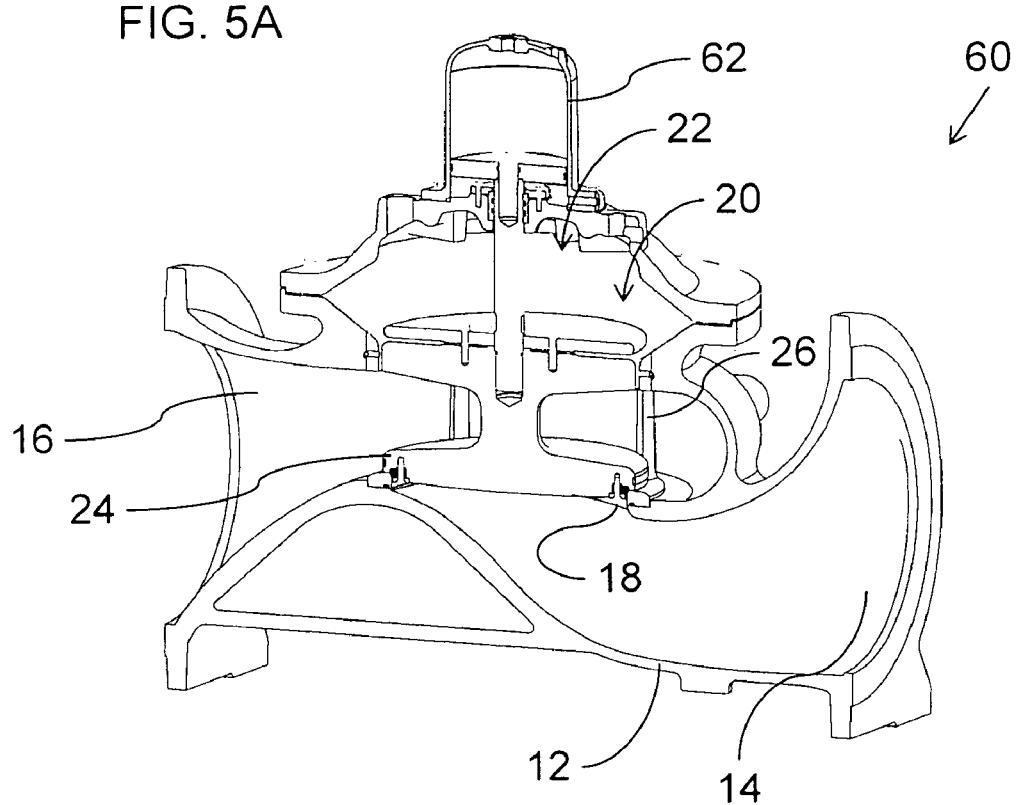
FIGS. 5A and 5B are cut-away isometric views showing a first variant of the control valve of FIGS. 1A and 1B including a supplementary actuator, the control valve being shown in closed and open states, respectively.
Figure 5B:
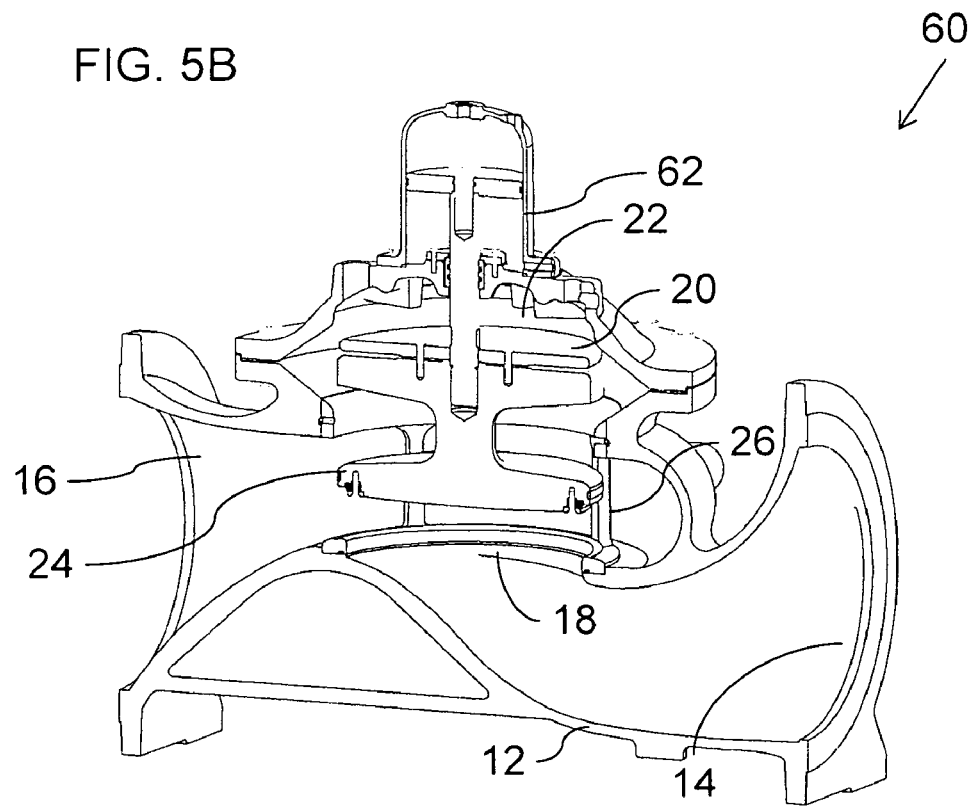

Turning now briefly to the remaining drawings, FIGS. 5A and 5B shown a control valve, generally designated 60, constructed and operative according to the teachings of the present invention. Generally speaking, control valve 60 is similar to control valve 10 described above, equivalent elements being labeled similarly. Control valve 60 differs from control valve 10 in the addition of a supplementary actuator 62 located outside control chamber 22 and mechanically linked to plug 24. In the non-limiting preferred example illustrated here, supplementary actuator 62 is a hydraulically powered piston actuator. Supplementary actuator 62 may be employed to supplement actuation forces generated by actuator 20, or as a separate override actuator such as an emergency shut-down controller, as is known in the art. In all other respects, the structure and operation of control valve 60 will be understood by analogy to the description of control valve 10 above.

Figure 6A:
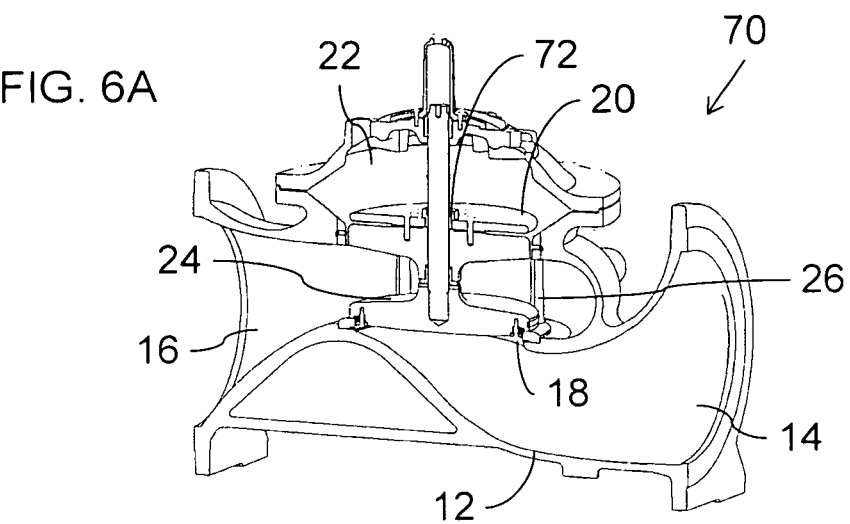
FIGS. 6A-6C are cut-away isometric views showing a second variant of the control valve of FIGS. 1A and 1B including a linear bearing to provide additional check-valve functionality, the control valve being shown in closed, open and check-closed states, respectively.
Figure 6B:
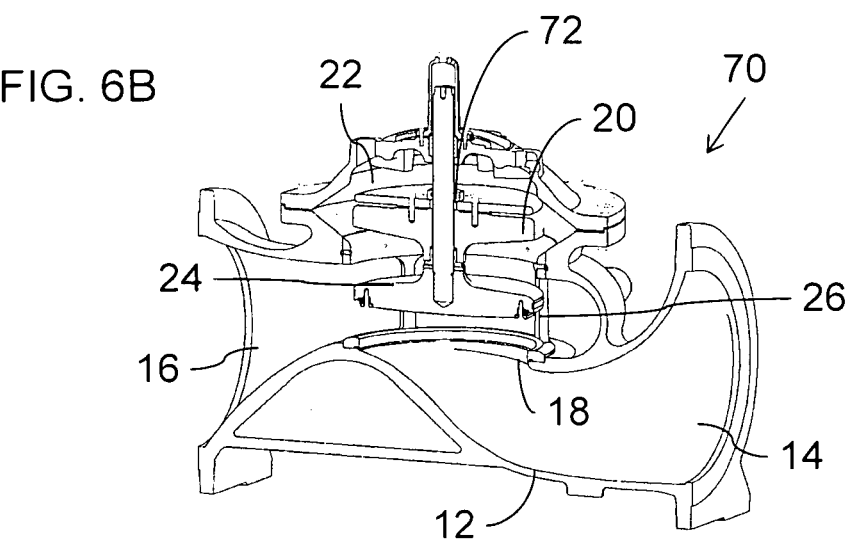
Figure 6C:
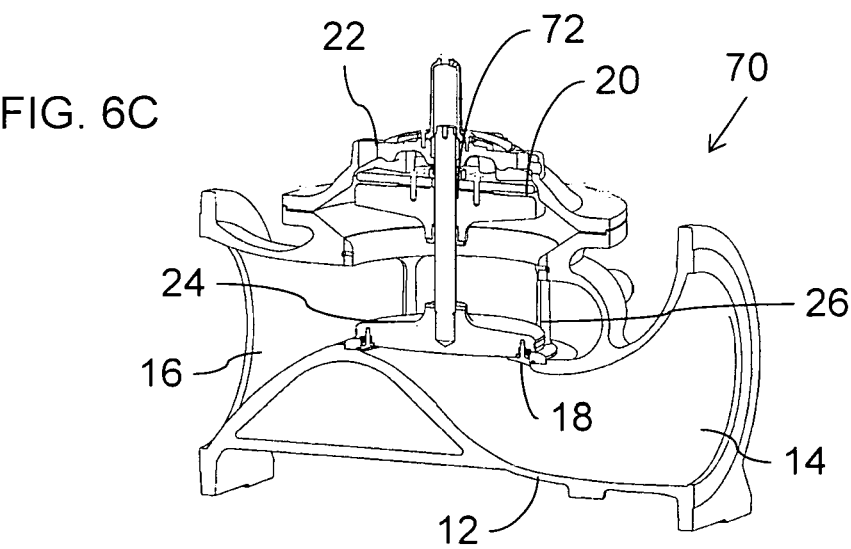

Turning finally to FIGS. 6A-6C, these show a control valve, generally designated 70, constructed and operative according to the teachings of the present invention. Generally speaking, control valve 70 is similar to control valve 10 described above, equivalent elements being labeled similarly. Control valve 70 differs from control valve 10 in the provision of a linear bearing 72 deployed between plug 24 and actuator 20 such that, when actuator 20 moves towards the withdrawn position (FIGS. 6B and 6C), plug 24 is free to move between an open position (FIG. 6B) in which fluid flows from inlet 14 to outlet 16 and a closed position (FIG. 6C) in which plug 24 closes against the closure surface of valve seat 28 so as to block the passage of fluid from outlet 16 to inlet 14, thereby operating as a check valve. When actuator 20 moves towards its extended position (FIG. 6A), it forces plug 24 to its closed position in a manner similar to FIG. 1B described above. In all other respects, the structure and operation of control valve 70 will be understood by analogy to the description of control valve 10 above.

It will be appreciated that the above descriptions are intended only to serve as examples, and that many other embodiments are possible within the scope of the present invention as defined in the appended claims.

What is claimed is:

1. A control valve for regulating flow of fluids comprising:
   (a) a body having an inlet, an outlet and a passageway through which the fluid passes from said inlet to said outlet, said passageway passing through an opening;
   (b) an actuator located in a control chamber connected to said body and configured to move along an axis through a range of motion from a retracted position to an extended position;
   (c) a plug associated with said actuator such that movement of said actuator from said retracted position towards said extended position displaces said plug towards said opening; and
   (d) a guide-and-seat insert including:
      (i) a valve seat configured to seal against said opening and to provide a closure surface against which said plug closes,
      (ii) a plurality of plug guides integrally formed with said valve seat and extending from said seat towards said control chamber, and
      (iii) a collar attached to or integrally formed with said plurality of plug guides and configured for clamping against an internal surface of said control valve so as to clamp said valve seat against said opening,
   such that, when said plug is displaced by said actuator, said plug moves in sliding engagement with at least two of said plug guides, and such that, when said actuator moves to said extended position, said plug closes against said closure surface of said valve seat so as to block the passage of fluid from said inlet to said outlet,
   and wherein said body and said control chamber intersect at a neck portion, and wherein said collar is provided with a radially-expanding clamping arrangement for clamping said guide-and-seat insert against an internal surface of said neck portion.

2. The control valve of claim 1, wherein said neck portion features a circumferential groove, and wherein said clamping arrangement includes a circumferential locking element circumscribing a majority of said collar and a tightening arrangement, said tightening arrangement being configured for displacing said circumferential locking element outwards into said groove so as to clamp said collar against said internal surface of said neck portion.

3. The control valve of claim 2, wherein said tightening arrangement includes a plurality of bolts deployed within substantially radial threaded bores spaced around said collar.

4. The control valve of claim 2, wherein said circumferential groove includes an inclined clamping surface deployed such that outward displacement of said locking element against said inclined clamping surface displaces said guide-and-seat insert towards said opening so as to clamp said seat against said opening.

* * * * *